Feb. 16, 1954 J. H. SMOOT 2,669,230
INJECTION APPARATUS
Filed July 30, 1947 3 Sheets-Sheet 1

INVENTOR.
John H. Smoot
BY Duell and Kane
ATTORNEYS

Feb. 16, 1954 — J. H. SMOOT — 2,669,230
INJECTION APPARATUS
Filed July 30, 1947 — 3 Sheets-Sheet 2
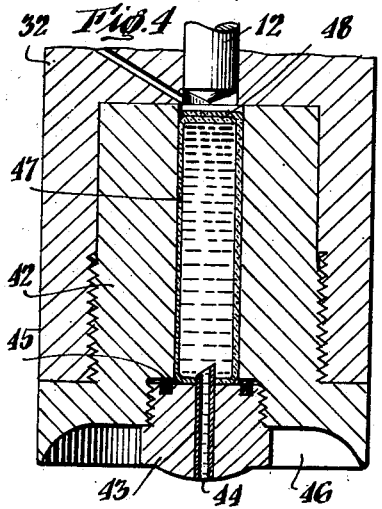
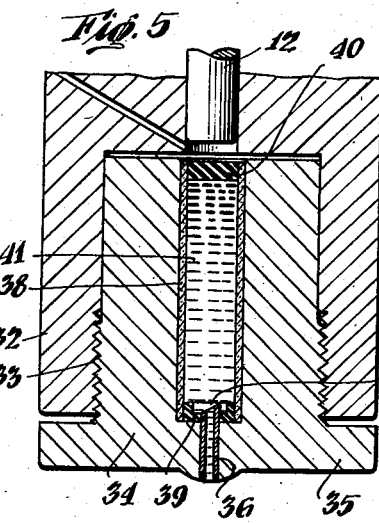
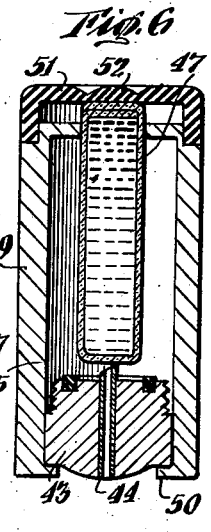
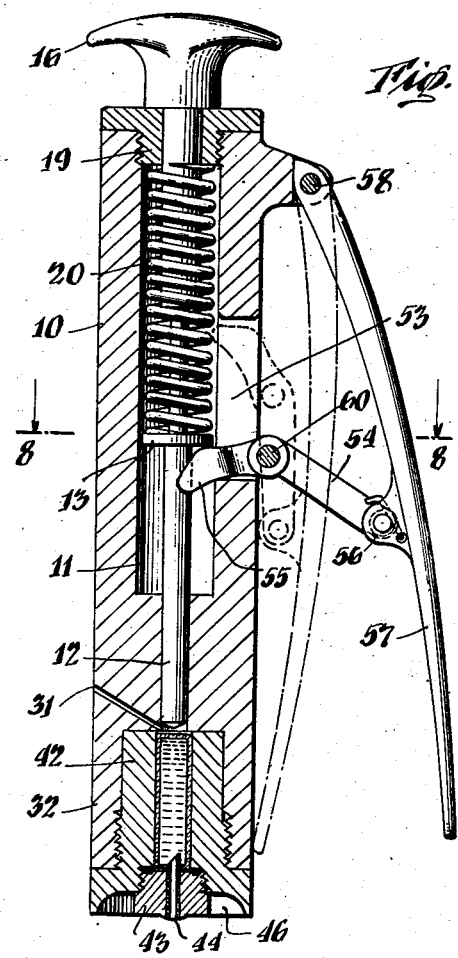
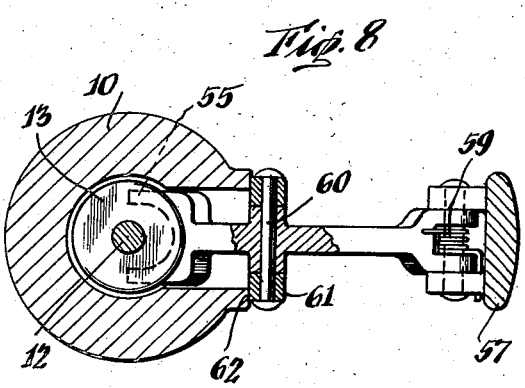
INVENTOR.
John H. Smoot
BY Duell and Kane
ATTORNEYS

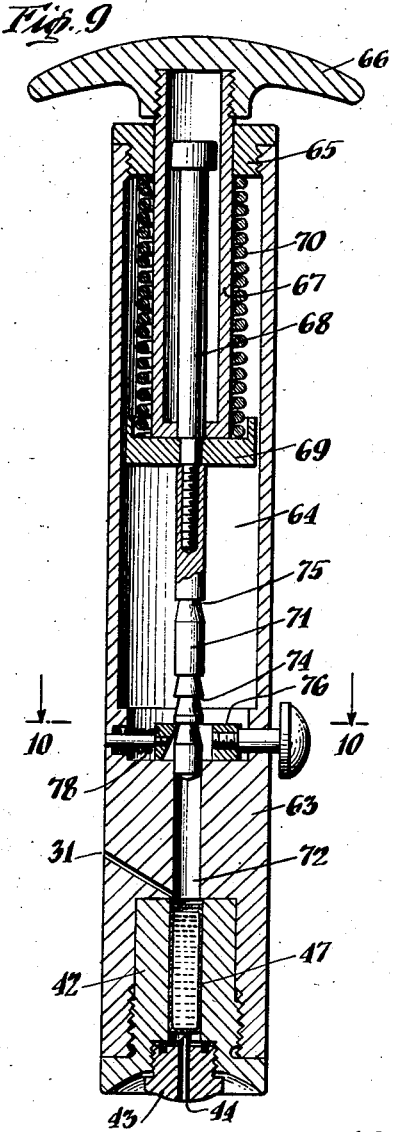
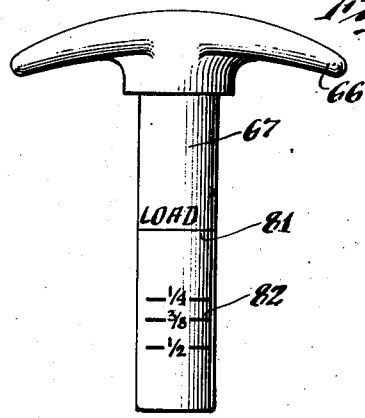
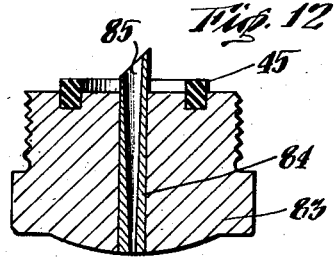
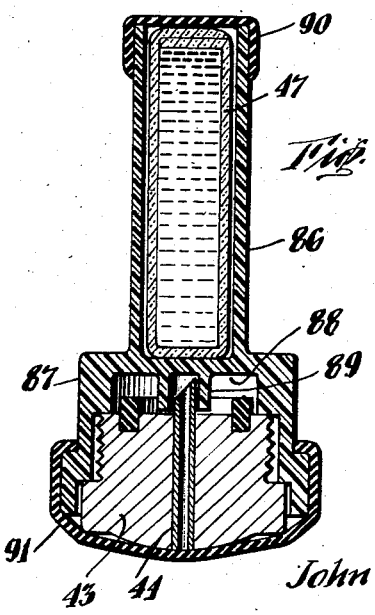
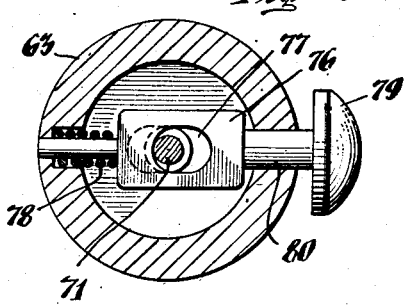

Patented Feb. 16, 1954

2,669,230

UNITED STATES PATENT OFFICE 2,669,230

INJECTION APPARATUS

John H. Smoot, Darien, Conn., assignor to Becton Dickinson and Company, Rutherford, N. J., a corporation of New Jersey Application July 30, 1947, Serial No. 764,817

7 Claims. (Cl. 128—173)

This invention relates to a structurally and functionally improved injection apparatus and ampule for use in connection therewith; the injection being capable of being achieved without the use of a skin piercing hollow needle.

It is an object of the invention to furnish an injection apparatus which may readily receive medicament and which by a simple operating technique will function to inject liquid medicament at skin-penetrating velocities and pressures through the epidermis.

A further object is that of furnishing an assembly of this nature, the several parts of which may readily be separated for the purpose of cleaning, sterilizing and removal of spent units or ampules.

A still further object is that of furnishing an ampule for use with such an apparatus and which ampule may readily be produced in large quantities and at small cost; the ampule serving to maintain medicament enclosed therein in proper sterile condition. Moreover, the ampule will embody a structure such that it may readily be placed in a sterilizer should such procedure be desired.

Another object is that of furnishing an ampule assembly which may be presented as a unit; the parts of the assembly being readily manipulatable so as to render the assembly ready for use just prior to the time that the injection is to be made.

Still another object is that of providing an injection apparatus embracing relatively few parts, each individually simple and rugged in construction, such parts being capable of ready assembly and operating over long periods of time with freedom from all difficulties.

With these and other objects in mind, reference is had to the attached sheets of drawings illustrating practical embodiments of the invention and in which:

Fig. 4 is a fragmentary enlarged sectional view of the structure which may be embodied in the lower or discharge portion of the apparatus and showing one form of ampule disposed therein;

Fig. 5 is a view similar to Fig. 4 but showing an alternative form of structure as well as a second form of ampule which may be employed;

Fig. 6 is a sectional side view of an ampule and showing the same associated with a piercing cannula and ampule supporting member;

Fig. 7 is a view similar to Fig. 1 but illustrating an alternative form of apparatus;

Fig. 8 is a transverse sectional view taken along the line 8—8 and in the direction of the arrows as indicated in Fig. 7;

Fig. 9 is a view similar to Figs. 1, 2 and 7 but showing a further form of unit;

Fig. 10 is a transverse sectional view taken along the line 10—10 and in the direction of the arrows as indicated in Fig. 9;

Fig. 11 shows one of the elements of the mechanism as illustrated in Fig. 9;

Fig. 12 is a sectional side view of a form of cannula structure which may be employed; and Fig. 13 is a similar view of a plug-cannula and ampule assembly.

Figure 1:
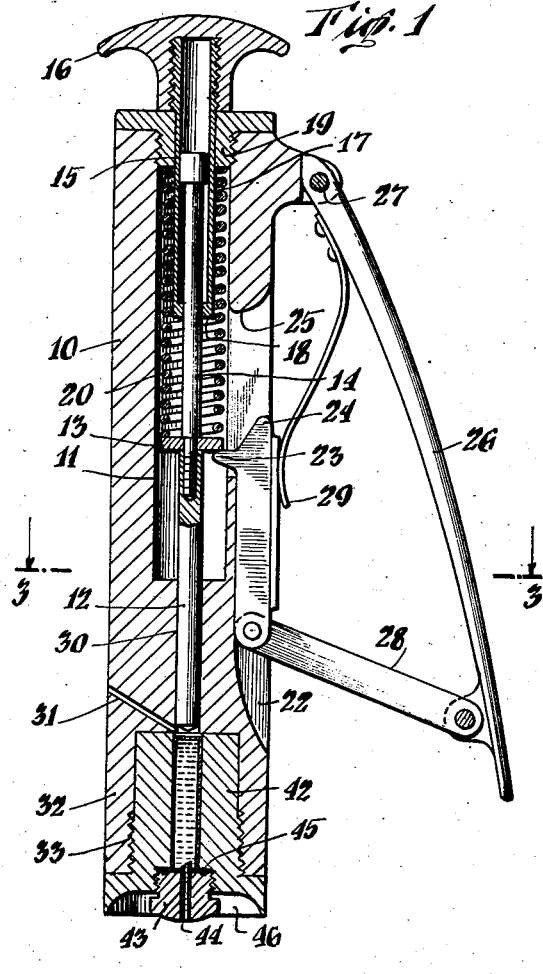
Fig. 1 is a sectional side view of one form of injection apparatus and showing the same ready for use.
Figure 2:
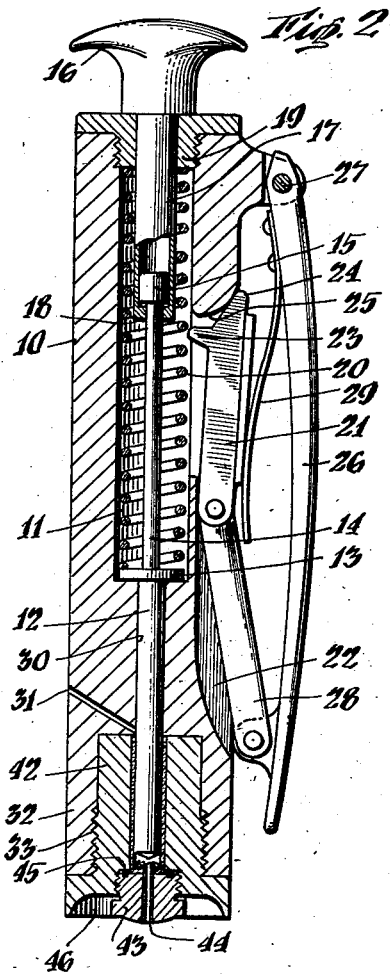
Fig. 2 is a similar view showing the positions which the parts assume after use.
Figure 3:
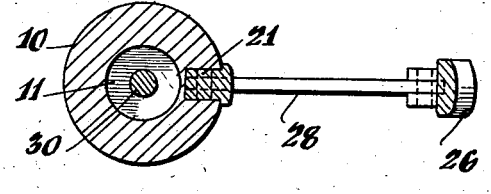
Fig. 3 is a transverse sectional view taken along the line 3—3 and in the direction of the arrows as indicated in Fig. 1.

Primarily referring to Figs. 1 to 3, the numeral 10 indicates a casing preferably formed of metal. This casing presents throughout its upper portion a bore 11. Slidably extending within this bore is a plunger assembly. The assembly includes a lower plunger portion 12, a washer or flange member 13 and a stem portion 14 to which a head 15 is secured. The structure of this assembly may be varied in numerous respects. However, it preferably includes these parts connected together—for example—in the manner shown. Also, the assembly should conveniently embody a maximum mass or weight.

With a view to retracting the assembly for purposes hereinafter brought out, a knob 16 may be provided. This knob is suitably connected to a tube 17. The lower end of the latter may be flanged inwardly as at 18 to define an opening through which the rod 14 extends. The head 15 has a diameter such that it may not pass through the opening. The tube 17 is slidably disposed with respect to the edges of an opening formed in the upper end of the tubular body 10; a flanged and apertured plug 19 conveniently extending in line with this opening for the purpose of providing a guide for the tube 17. At this time it will also be observed that a spring 20 is interposed between the plug 19 and the flange member 13 forming a part of the plunger assembly.

In order to provide a mechanism by means of which the assembly may be potentialized and released for projection, a pawl member 21 is slidably mounted in a slot or groove 22 conveniently formed in the outer face of the body 10. This pawl member has an inwardly extending projecting portion 23 and an upwardly inclined end 24. The upper end of the slot 22 terminates in a cam surface 25 for cooperation with the inclined surface of the portion 24. A handle 26 is pivotally connected to the casing or body 10 as at 27. A link 28 may connect the lower end of the pawl member 21 with the handle 26. A spring 29 normally maintains this handle in an outward position as indicated in Fig. 1. This spring also conveniently bears against the outer edge of member 21 in order to maintain the latter firmly within the groove 22 or trackway of the body 10.

The lower end of the body 10 is preferably continued as the form of a relatively reduced bore 30 having a diameter slightly in excess of that of the plunger portion 12. This bore 30 forms a continuation of the recess or bore 11. A venting opening or passage 31 may be provided for the flow of air as the plunger portion 12 is shifted. The lower end of body 10 beyond the bore 30 may be counterbored to, in effect, provide a hollow end portion 32 which is conveniently formed with screw threads 33 adjacent its outer end.

As shown in Fig. 5, this hollow end portion of the body receives a plug 34 which is conveniently threaded to cooperate with the threads 33. The outer end of the plug, as illustrated in this figure, is conveniently in the form of an enlarged or flange portion 35, the outer edges of which may be knurled so that the plug may readily be associated with or removed from the body 10. The length of the main plug portion 34 should be such that with the plug properly secured within the recessed lower end of body 10, that plug portion will substantially completely fill the recess. As also shown in Fig. 5, the outer face of the plug may be formed with an opening which defines a passage extending through to the chamber which forms a part of the plug 34.

This opening conveniently receives a cannula 36, the outer end of which is blunt and terminates in line with the outer face of portion 35. The inner end of the cannula 36 extends into the chamber of the plug for a small distance and terminates in a pointed or piercing end 37. The passage provided by the bore of the cannula should be relatively fine. The outer end of the same, under ordinary conditions, defines an orifice on the order from .003" to .005". In line with the cannula, the lower face of the plug 35 may be bulged outwardly to provide a convex portion. The area of this portion may be as large as desirable consistent with maintaining a zone of "seal" between the surface being contacted and the cannula mouth.

Disposed within the chamber of the plug, as in Fig. 5, is an ampule which may include a tubular body 38 formed of glass, plastic or other suitable materials. The lower end of this ampule is closed by a pierceable seal 39, the upper end of the same being closed by a stopper 40, which may conveniently by formed of rubber. The space within the ampule intervening between the stopper 40 and the closure 39 is filled with a body of medicament 41. The plunger portion also indicated by the numeral 12 in this figure, corresponds substantially to the plungers shown in the other figures excepting that its inner end is preferably flat instead of being pointed.

The ampule and assembly of the parts as shown in Fig. 4 is in many respects preferred to that just described. As will be seen in that figure, the plug 42 is secured to the end portion 32 of the body 10 as heretofore brought out. The plug 42 is also formed with an ampule-receiving chamber. However, instead of the lower end of the main plug portion defining a discharge orifice, that plug portion is bored and threaded to receive a screw threaded supporting element or plug 43. The latter is formed with an opening within which a cannula 44 is disposed. This cannula may correspond to the cannula 36 and also has its inner end projecting beyond the inner face of the supporting element 43. Similarly to the plug 34 adjacent the cannula 36, the plug 43 may have its outer face convexly bulged or curved throughout a greater or lesser area. If desired, a packing 45 may be provided to assure against leakage between the element 43 and the plug 42. It will also be understood that the outer edge of the element 43, which extends within the recessed portion 46 in the lower plug face, may be knurled. Likewise, the outer edge portion of plug 42 may be knurled. The parts are so proportioned that an operator may readily grip the parts with his fingers or else apply a suitable tool to detach the plug 43 from the plug 42.

The ampule indicated by the numeral 47 and which is the preferred form of medicament container, embraces an imperforate body filled with medicament. This body may be formed of a bendable plastic, metal foil, impregnated paper, rubber or any other desired material which is capable of being collapsed or crushed. The ampule will preferably be cylindrical in shape. Its upper end may be reinforced by including two layers of material as indicated at 48. It is at this point that the ampule may be filled after which the adjacent layers are overlapped, folded together, vulcanized, pasted or otherwise sealed to provide an imperforate body.

The assembly shown in Fig. 6 may include an element 43 as described in connection with Fig. 4 as well as an ampule 47 likewise described in connection with that figure. Otherwise, an ampule such as 38 in Fig. 5 or any other desired medicament-containing unit may be employed. In any event, the ampule and element are enclosed in a container 49 which may be formed of fiberboard or other material. This container may have one or more lips 50 at its lower end for retaining the element 43. Its upper end may be closed by a lid portion 51. As is apparent, the entire assembly may be sold and will remain assembled until it is ready for use. If desired at that time, the unit may be placed in a sterilizer. In any event, when it is desired to employ the same, an operator by bringing pressure to bear on the central portion 52 of the lid may force the ampule 47 into engagement with the element 43. Such force may be sufficient to even cause the cannula 44 to penetrate the base end of the ampule. Regardless of whether this occurs or not, the pressure serves to cause the lips 50 to be straightened so that the ampule and element may be removed from the container 49 as a unit. Thereupon, the container may be discarded.

Referring to the alternative form of apparatus shown in Figs. 7 and 8, the numerals 10 to 20 indicate parts corresponding in function and also preferably structure, to those heretofore described in connection with Figs. 1 and 2. However, in lieu of a groove 22, the side of the casing is formed with a slot 53. Extending through this slot is a lever 54 having a forked inner end 55. Such end is cooperable with the flange member 13. Lever 54 is pivotally secured as at 56 to a handle 57. The latter is pivotally connected as at 58 with the casing 10. A spring 59 serves normally to depress the forked end 55 of lever 54. Therefore, the handle 57 is normally in a position such as has been shown in full lines in Fig. 7. A pivot pin 60 is carried by lever 54 and may mount rollers 61 adjacent its ends. These rollers bear against flat surface portions 62 preferably integral with casing 10.

It is apparent that when handle 57 is moved inwardly with the parts positioned as in Fig. 7 the forked end 55 will engage under the member 13. Continued inward pressure will cause rollers 61 to move over trackway 62. This will result in an elevating of the member 13 and the remainder of the plunger assembly. Continued inward movement to the position indicated in dash lines, will cause the forked end 55 to move out of contact with the flange 13. Thus, the plunger assembly will be released for projection by the spring 20.

In the form of unit shown in Figs. 9, 10 and 11, the numeral 63 indicates the tubular body of the device with which a plug assembly and ampule as heretofore described in Fig. 4 may be associated. The body 63 has the upper end of its bore closed conveniently by a plug or cap 65. A handle 66 may be connected in any suitable manner with a sleeve 67. The latter extends slidably through the cap 65 and into the tubular bore 64. The lower end of the sleeve receives the upper or rod portion 68 of the plunger assembly which, as in Figs. 1 and 2, is preferably headed. The rod 68 is attached to a cup or flanged member 69 and a spring 70 is interposed between this cup and the cap 65. A plunger 71 is connected to the rod 68 and is projectable into the bore 72 of the body 63.

The plunger 71 may be formed with a group of (for example three) inclined shoulder portions 74. A further shoulder portion 75 may also be provided. A transversely extending latch element 76 is slidably mounted by body 63. This element is formed with an opening 77 for the passage of plunger 71. The element is mounted for sliding movement in a plane transverse to the body 63. A spring 78 normally maintains element 76 in what might be termed a retracted position. An actuator button 79 or similar unit may be secured to the element-mounting rod 80 so that it may be projected. As will be understood, due to the trigger structure thus furnished, the plunger assembly may be retained in partially or wholly retracted positions and released from those positions when desired.

As shown particularly in Fig. 11, the sleeve 67 may have upon its face indicia as indicated at 81 and 82. The spacing of this indicia corresponds conveniently to the spacing of the inclined shoulder or ratchet portions 74 and 75. The indicia 81 or 82 may be conveniently read as the sleeve 67 is pulled to project to an increasing extent beyond the upper surface of cap 65. Registration of this indicia may occur with the upper surface of the cap; it being understood that a greater or lesser amount of indicia may be provided and that this will correspond to the number of stops or latch portions 74 and 75 associated with the plunger assembly.

Under certain circumstances, it might be desired that the plug or supporting element mount a cannula having—for example—a tapered bore. This has been shown in Fig. 12 in which the numeral 83 indicates the plug which corresponds generally to the plugs as heretofore described in Figs. 4 and 6. Again, this plug may have its outer face convexly surfaced. The cannula 84 has its outer end conveniently terminated flush with this outer face, its inner end projecting beyond the inner face of the plug or element 83. The bore 85 of the cannula may be tapered throughout its length, or otherwise reduced towards its outer end. In any event, it presents a relatively fine or reduced discharge orifice which may have a value such as, or larger than that afore indicated.

Finally, as in Fig. 13, a package assembly may be furnished containing an ampule such as 47 filled with medicament and adjacent which a plug 43 mounting a cannula 44 is disposed. The assembly will embrace a conveniently reduced tubular upper end 86 presenting an enlarged base portion 87. A transverse wall 88 may be provided between the tubular portion 86 and base 87. This wall mounts an extension 89 to receive and protect the upper end of the cannula. Also, such wall will prevent any accidental piercing of the ampule 47. All of these parts may be formed of a molded plastic. A cap 90 conveniently of rubber may normally retain the ampule while a cap 91 similarly of rubber may close the open end of the base portion 87. Thus, the plug or element 43 will be retained against accidental displacement.

Now considering the operation of the apparatus, it will primarily be understood that a plug 34 (as in Fig. 5) or an assembly (as in Fig. 4) has been detached from the holder or body 10. The chamber of the plug receives the ampule. In the case of the structure shown in Fig. 5, this is accomplished by inserting the ampule 38 into the chamber until the pointed inner end of the cannula 36 penetrates the plug or seal 39. Thereafter, plug 34 is inserted within the lower portion 32 of the body 10. At that time, the apparatus is ready for use. In any event, and as indicated in Fig. 4, the parts are preferably manipulated so that the medicament flows into and fills the bore of the cannula. This may be evidenced by a droplet of that medicament appearing at the outer end of the passage. Thus, the operator will be aware of the fact that no air remains in the cannula.

In the case of an ampule such as 47 in association with the structure of Fig. 4, that ampule may, for example, be inserted into the chamber of the plug 42 after the latter has been detached from the body 10. If such procedure is not desired, then the ampule may be inserted through the lower opening in the plug with the element 43 removed. In any event, either as the element 43 is tightened or the plug 42 is tightened (with the element in position), the cannula 44 will have its pointed inner end penetrate the ampule. Therefore, the apparatus will again be ready for use. In such use the technique should preferably include the removal of air from the cannula bore as afore brought out.

Now assuming that an injection is to be made by a mechanism of the type shown in Figs. 1, 2 and 3, it will be appreciated that with the parts in the position shown in Fig. 1, the operator will bring the lower face of element 43 into intimate contact with the skin overlying the area to be injected. Incident to the convex or "bumped" surface which is preferably presented by the outer face of the plugs, only relative minor pressure will be necessary to assure that a "sealing" and non-slipping contact is established between the skin and the outer end of the cannula. While continuing such pressure as may be necessary to maintain that contact, handle 26 is moved inwardly with respect to the body 10. In other words, these elements are grasped in the hand and a squeezing action is exerted. As a consequence of this action, a thrust will be exerted upon link 28. This thrust will be transmitted to the member 21 and will cause the latter to move upwardly within the groove 22 or other guiding structure. With the pawl projection 23 engaging member 13, it follows that the latter will be moved upwardly or outwardly and correspondingly retract the entire plunger assembly. This action will continue until the spring 20 is substantially fully compressed. At that point, the cooperating surfaces of portions 24 and 25 will be immediately adjacent each other. Therefore, a slight additional projection of element 21 will cause these surfaces ot cooperate. This will result in member 21 being swung outwardly against the action of spring 29. Such swinging will cause the pawl projection 23 to move out of engagement with the flange member 13.

Accordingly, the plunger assembly will be released. Under the action of the spring, the assembly will be projected with considerable force towards the ampule. Any air which would otherwise result in a cushioning or slowing down of the projection rate will escape through vent 31 or by means of the clearances which exist. The mass of the plunger assembly should incorporate a high value. Thus, this mass with the momentum imparted to it will serve to cause a relatively violent engagement between the end of plunger portion 12 and the head portion 48 of the ampule. This head portion will therefore move inwardly, thus collapsing the ampule upon itself until a position of the parts such as has been shown in Fig. 2 results. Under certain circumstances, and according to the structure of the ampule, the collapsing of the same may actually involve a crushing or disintegration. Under other circumstances, merely the head portion of the ampule will in effect be severed. Under those conditions, that portion will function as a follower. Therefore, where hereafter a crushing action is referred to, this is to be construed in a generic manner. It will be remembered that the bore of the cannula 44 is in communication with the interior of the ampule due to the fact that the end of the former has pierced the lower wall of the latter. Of course, the parts might be proportioned so that such piercing will not occur except under the action of the plunger portion 12 in striking against the ampule and causing the latter to be projected against the pointed end of the cannula. However, it is ordinarily preferred that a piercing of the ampule be effected in the manners heretofore brought out.

As the ampule is collapsed, the contained medicament is expressed under high pressure and velocity from the bore of the cannula. This will permit in the medicament being injected—without the use of any piercing needle—through the epidermis. The depth of the injection will, of course, depend upon the force with which the plunger portion 12 strikes the ampule, the degree of intimacy of contact between the apparatus and the skin of the patient, the volume and length of the ampule and other variable factors. If it is desired to vary the amount of medicament to be injected into different patients, it is preferred that ampules of different capacities and lengths be employed. Of course, in the form of apparatus shown in Figs. 1, 2 and 3, variation may also be achieved by having the cam surface 25 closer or further away from the cooperating surface of portion 24. However, under such procedure, it is apparent that when a smaller and/or shallower injection is desired, a portion of the medicament within the ampule will be wasted if ampules of equal capacity are employed throughout. This generally is undesirable.

If an ampule of the type shown in Fig. 5 is employed then the same technique is followed as heretofore described. It is apparent that the plunger portion 12 will strike the follower 40 and cause the latter to be projected through the bore of the ampule 38. Such projection will cause the follower to function as a piston to express the medicament through the bore of cannula 36. Regardless of whether an ampule of the type shown in Fig. 4 or Fig. 5 is employed, the fully projected position of the plunger portion 12 should be limited in a manner such that the end of the plunger will never strike against the inner end of the cannula. Otherwise, that pointed end will become damaged and these parts will have to be renewed. This might well be immaterial in the case of an element such as 43 where it is contemplated that a "one time" use of the element as well as the ampule is to occur. However, in the case of a plug such as 34, unnecessary expense would be involved.

Now, if it is desired to remove the discharged ampule, it is obvious that this may be achieved by simply dismounting the plug 34 as in Fig. 5 or the plug 42 as in Fig. 4. In the latter structure in certain instances, all that may be necessary will be to remove the element 43. However, ordinarily to clean the chamber of the unit 42, the entire unit should be removed. In the case of structure such as is shown in Fig. 5 being employed, then any suitable expedient may be used to retract or withdraw the ampule from the chamber of the plug. Thereupon, this chamber may receive a new filled ampule.

The purpose of the knob 16 or its equivalent now becomes apparent in that with the parts projected as in Fig. 2, the plunger portion 12 extends into the chamber of the plug. However, by grasping and retracting the knob 16, the plunger assembly is shifted to a point where the flange 13 thereof rides past the projecting pawl portion 23 so that the parts assume the positions shown in Fig. 1. In such action, it is apparent that spring 29 constantly exerts a pressure against member 21 to assure that it will tend to have its pawl portion extend below the flange member 13. When the parts have assumed the proper positions, the knob 16 is returned to its normal station.

The same coaction of the parts is true of the structure shown in Figs. 7 and 8. As heretofore briefly outlined, a squeezing of the handle 57 towards the body 10 results in the forked portion 55 bearing against the flange 13 with sufficient force to raise the latter and the plunger assembly. Such raising will continue until the spring 29 has been substantially fully compressed. At that point and as indicated in dash lines in Fig. 7, the forked portion 55 will ride out of contact with the flange 13 and release the plunger assembly for projection. With such projection, the contents of the ampule will be discharged as also heretofore brought out. A new ampule being available, it follows that the unit may again be charged to duplicate the foregoing functions and after the knob 16 or its equivalent has been retracted. In such shifting, the flange 13 will engage the forked member 55. The latter will thereupon cam against the flange surfaces and around its pivot 56. In such movement it will be resisted by the spring 59 which will constantly tend to swing the link or arm 54 inwardly. Therefore, as soon as flange 13 is elevated to a position where it clears the forked portion 55, the latter will assume the position shown in full lines in Fig. 7.

In the form of structure shown in Figs. 9, 10 and 11 it will be understood that in common with the structures of all of the heretofore described units, the plug and cannula assembly is similar and removable for the purpose of cleaning and recharging the apparatus. Also, in common with the structures shown in Figs. 1 and 2, an operator by retracting the plunger assembly, to where the shoulder 75 engages the latch element, may cause the parts to assume positions at which the unit may be loaded, or in other words have an ampule associated with it. As will be apparent with shoulder 75 engaged by the latch, the outer end of plunger 71 is wholly retracted from the bore of plug 42. To cause the parts to thus shift, all that an operator will have to do is to grasp the handle 66 and pull the same. This will initially result in an engagement of the head of rod 68 with the base of tube 67. Continued pulling will result in a compression of spring 70. When the indicia 81 is in line with the cap, shoulder 75 will be engaged by the latch.

After the unit has been "loaded," an operator may approximate a discharge of medicament to be injected by continuing to pull handle 66 until one of the indicating marks 82 is in registry with the upper edge of cap 65. It will be understood that the further the spring 70 is compressed, the greater will be the violence of the resulting blow between the plunger and the ampule. The less the violence of that blow, the less injection of medicament and depth of injection will occur. Therefore, assuming that the ampule has an outside capacity of one-half cc., then it is apparent that if the plunger 71 is retracted until the latch or trigger element is aligned with the outermost of the shoulders 74, a full injection will occur within the limits of capacity of the ampule. A lesser retraction of the plunger assembly will result in a less forcible projection of the plunger with a decrease in the injected dosage.

Regardless of whether a tapered-bore cannula such as 84 is employed, or whether a cannula as shown in Figs. 1 to 10 inclusive is utilized, the velocity and pressure of the liquid will result in an injection without the use of a needle. Where an assembly as in Fig. 13 is utilized, sterility may be maintained and there will be no danger of the cannula piercing the ampule prior to the time that the parts are assembled. The unit, as in this figure, may be placed in a sterilizer. After removal of the cap, the ampule 47 may be guided by the tubular extension 86 into the ampule-receiving chamber of the unit. After the cap 91 has been removed, the plug 43 may simply have its knurled side edges grasped by the operator for mounting purposes. Thus, the parts will never have to be re-sterilized.

Thus, among others, the several objects of the invention as afore noted are achieved. Obviously, numerous changes in construction and rearrangement of the parts might be resorted to without departing from the spirit of the invention as defined by the claims.

What I claim is:

1. An apparatus for injecting liquid medicament through the skin without the use of a skin-penetrating hollow needle, said apparatus including a casing presenting a medicament-containing recess, movable means cooperable with the liquid contained in said recess to expel the liquid therefrom, a shiftable plunger mounted by said casing, a spring cooperating with said plunger to cause an expulsion of the liquid from the casing, a handle pivotally secured to said casing to initially extend at an acute angle with respect to the latter, a lever having one of its ends swingingly connected to said handle, a forked end portion defining a plunger-engaging part at the opposite end of said lever and means for slidably and rockably guiding said lever with respect to said casing.

2. An apparatus for injecting liquid medicament through the skin without the use of a skin-penetrating hollow needle, said apparatus including a casing presenting a medicament-containing recess, movable means cooperable with the liquid contained in said recess to expel the liquid therefrom, a shiftable plunger mounted by said casing, a spring cooperating with said plunger to cause an expulsion of the liquid from the casing, a handle pivotally secured to said casing to initially extend at an acute angle with respect to the latter, a lever having one of its ends swingingly connected to said handle, a forked end portion defining a plunger-engaging part at the opposite end of said lever, a projection extending transversely of said lever and having slidable and rockable bearing with relation to said casing and whereby as said lever is caused to swing and shift incident to the movement of said handle, the forked end portion of said lever will move out of operative engagement with said plunger.

3. An apparatus for injecting liquid medicament through the skin without the use of a skin-penetrating hollow needle, said apparatus including a casing presenting a medicament-containing recess, movable means cooperable with the liquid contained in said recess to expel the liquid therefrom, a shiftable plunger mounted by said casing, a spring cooperating with said plunger to cause an expulsion of the liquid from the casing, a handle movably connected to said casing and to initially extend at an acute angle with respect to the axis of the latter, a member cooperable with said plunger, a link connecting said handle with said member, a guide portion slidably supporting the latter, said member shifting in response to a swinging of said handle towards the casing axis to compress said spring and release said plunger.

4. In an apparataus for ejecting fluid medicament into tissues without the aid of a skin-piercing needle, a rigid ampule supporting member having an outer and an inner face and formed with a medicament discharge passage extending between said faces and which passage at least adjacent the outer member face is of minute cross sectional area, mounting means forming a part of said member for supporting the same with respect to an element defining an ampule-receiving chamber, the outer face of said member being convexly curved adjacent the zone of said passage to provide a skin-contacting surface and an ampule piercing projection extending from the inner face of said member at a point adjacent the zone of the passage.

5. In an apparatus for ejecting fluid medicament into tissues without the aid of a skin-piercing needle, a rigid ampule supporting member having an outer and an inner face and formed with a passage extending between said faces, a cannula fixedly disposed within said passage and having its outer end terminating at a point adjacent the outer face of said member and at least said outer end being of minute cross sectional area, mounting means forming a part of said member to support the same with respect to an element defining an ampule-receiving chamber, the outer face of said member being convexly curved adjacent the zone of the passage to provide a skin-contacting surface and the inner end of the cannula extending beyond the inner face of said member to furnish an ampule-piercing projection.

6. In a hypodermic apparatus to inject medicament without the aid of a skin-piercing needle in combination, a unit for connection to the body of such apparatus, said unit presenting inner and outer faces, a cannula extending through said unit, at least that end of the cannula adjacent said outer unit face having its bore of a restricted diameter such that it will define a column of liquid medicament of skin-penetrating fineness, the outer face of said unit providing a surface for direct contact with the skin, the opposite cannula end being pointed and extending beyond the inner face of said unit to penetrate an ampule disposed adjacent thereto and the length of said cannula being restricted to a degree such its inner end extends beyond the adjacent unit face a distance less than the distance between the faces of the latter.

7. A hypodermic injection apparatus including in combination a casing, means for operatively supporting adjacent one end of the same an element defining a medicament chamber, a plunger carried by said casing and projectable to expel fluid from said chamber, a pressure accumulator within said casing and connected to said plunger to project the same, a handle having one of its ends pivotally connected to said casing to initially extend at an acute angle with respect to the axis of the latter whereby said casing and handle may be grasped by one hand and said handle may be swung towards the casing axis and means releasably connecting said handle with said plunger to compress said accumulator and thereupon free said plunger for projection under continued swinging action of said handle.

JOHN H. SMOOT.

References Cited in the file of this patent

UNITED STATES PATENTS

| Number | Name | Date |
|---|---|---|
| 1,767,304 | Morton | June 24, 1930 |
| 1,770,634 | Smith | July 15, 1930 |
| 1,924,785 | Grifols y Roig | Aug. 29, 1933 |
| 1,927,274 | Baur | Sept. 19, 1933 |
| 2,147,616 | Chaput | Feb. 14, 1939 |
| 2,221,739 | Reiter | Nov. 12, 1940 |
| 2,314,848 | Polzer | Mar. 23, 1943 |
| 2,322,244 | Lockhart | June 22, 1943 |
| 2,348,337 | Francis | May 9, 1944 |
| 2,398,544 | Lockhart | Apr. 16 1946 |
| 2,404,316 | Sack | July 16, 1946 |